United States Patent [19]
Vockenhuber et al.

[11] 3,826,567
[45] July 30, 1974

[54] CAMERA

[75] Inventors: Karl Vockenhuber; Otto Freudenschuss; Peter Révy Von Belvárd, all of Vienna, Austria

[73] Assignees: Karl Vockenhuber; Raimund Hanser, Vienna, Austria

[22] Filed: June 1, 1973

[21] Appl. No.: 366,217

[30] Foreign Application Priority Data
June 6, 1972  Austria .............................. 4838/72
June 6, 1972  Austria .............................. 4837/72
July 4, 1972  Austria .............................. 5721/72
July 12, 1972  Austria .............................. 5966/72

[52] U.S. Cl. .................................. 352/137, 352/133
[51] Int. Cl. ........................................... G03b 19/18
[58] Field of Search ....... 352/79, 80, 132, 133, 121, 352/137, 169, 94; 95/12, 37, 31 PF

[56]  References Cited
UNITED STATES PATENTS
2,042,983  6/1936  Fairchild ...................... 352/133 X
2,616,342  11/1952  Thompson ....................... 95/31 PF Primary Examiner—Monroe H. Hayes

[57]  ABSTRACT

A camera is able to receive simultaneously a still photographic film and a cinematographic film. It has an optical system which is, at least in part, common to both types of film. Release mechanisms for respective still and cine shutters are connected to one another and to a mirror which is displaceable between positions in which it directs light to the still and cine films respectively, so that release of the still shutter is inhibited while the mirror is in its cine position and vice versa. The shutter release mechanisms may be operated by respective controls or a two-position common control. The optical system may be adjustable to suit the different frame sizes of the still and cine films, and may include arrangements for compensating for the different film sensitivities. The films may be in respective cassettes bearing sensitivity codes sensed automatically by the camera.

26 Claims, 28 Drawing Figures

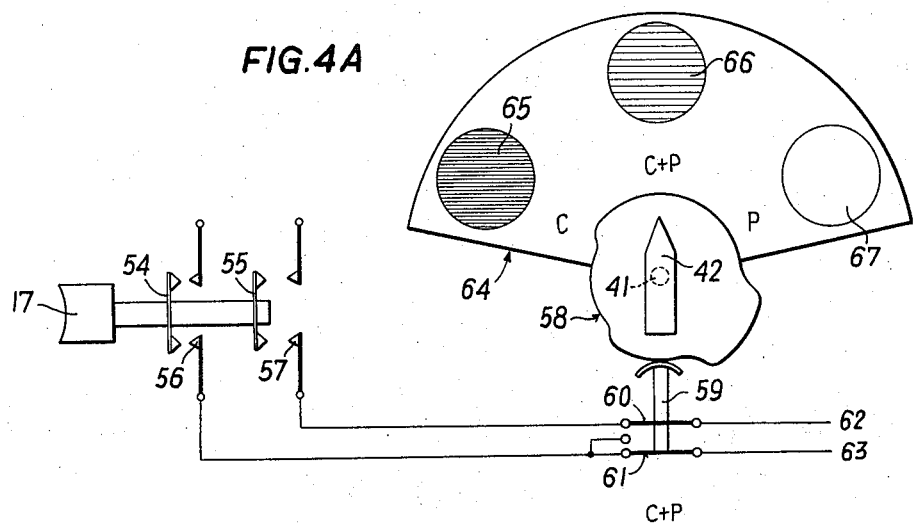
FIG.4A
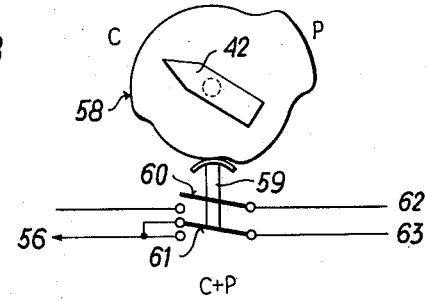
FIG.4B
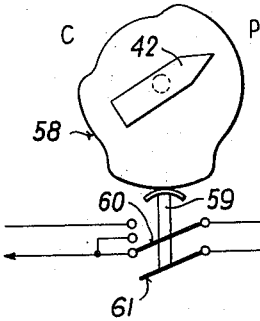
FIG.4C
FIG.5
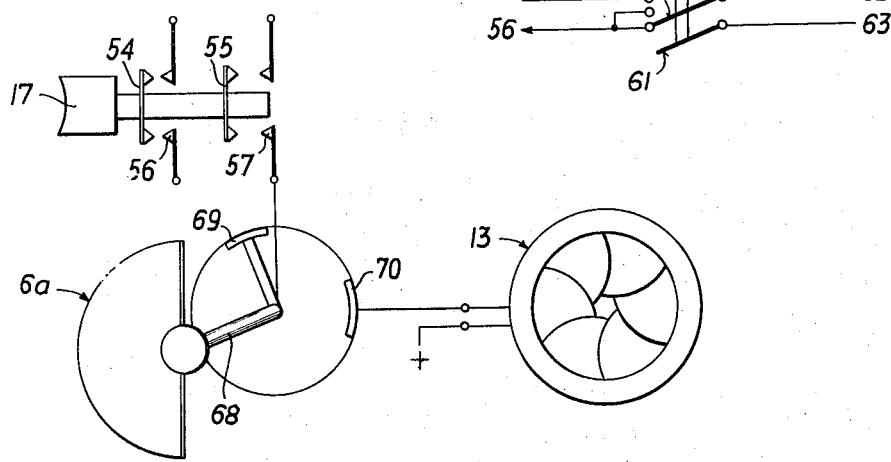

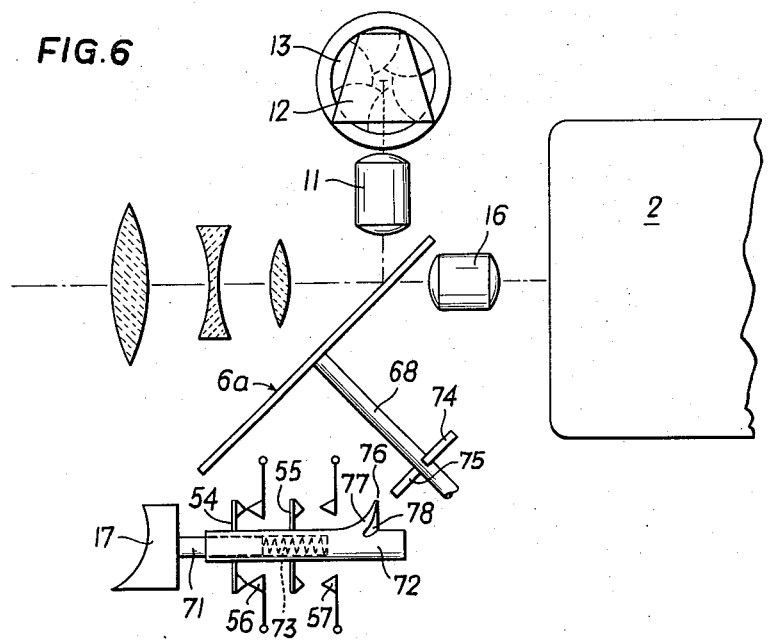
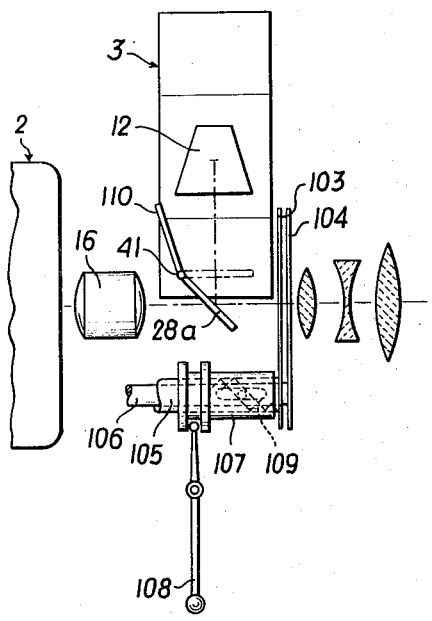
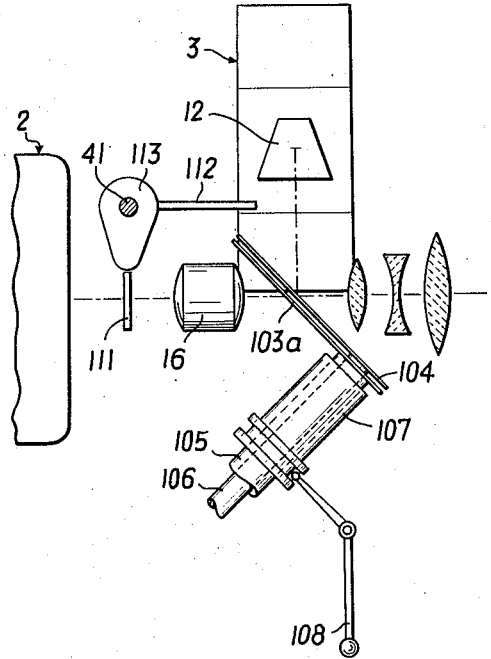

FIG. 22
FIG. 21
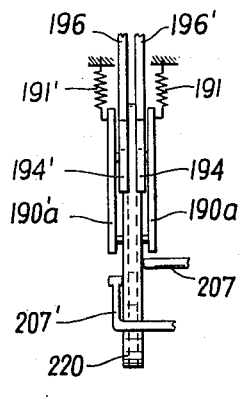
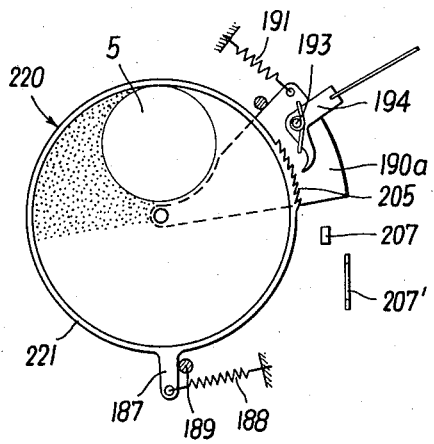
FIG. 23
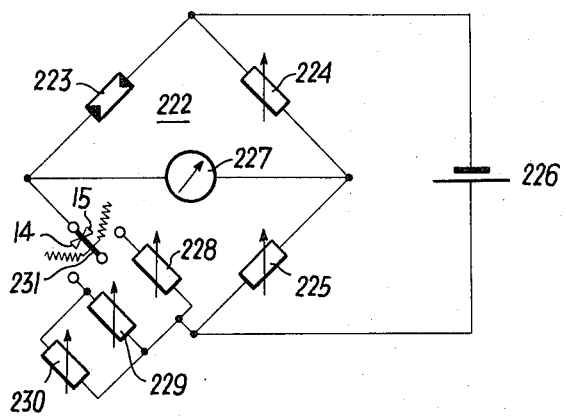

CAMERA

BACKGROUND OF THE INVENTION

1. Field of the Invention

The invention relates to a camera adapted for taking still or moving photographic pictures on different films, preferably accommodated in cassettes.

2. Description of the Prior Art

In previous cameras of this type the cassettes for the cine and still film were arranged behind each other, and for exposing the rear film the front cassette had to be removed from the camera. Thus the changing over from the one to the other type of photography was a complicated operation. True, it is already known to locate both cassettes in a common housing, a separate objective being provided for each film. This amounts, however, to mounting two complete cameras in a common housing. Finally, it is likewise known to place both film cassettes in one housing and to position the common objective alternatively before one cassette or the other. This too requires complicated manipulation, and does not allow simultaneous exposure of both films. Although it is further known in television cameras to bring one light beam into the television exposure tube, while a further light beam is directed at a film, the problems of a television camera are fundamentally different from those in a camera of the kind mentioned at the outset, inasmuch as the television tube does not require a shutter.

SUMMARY

The invention is based on the problem of giving such a form to a camera of the type mentioned at the outset as to enable at least the change-over from the one kind of exposure to the other to be effected in a simple way, without recourse to any complicated manipulation. It is further to be ensured that in each case only the correct shutter can be actuated. This problem has been solved according to the invention by providing an optical system that is at least partly common to both types of film and may include an exposure control system, as well as release and shutter means separately associated with each type of film.

The invention will now be described in more detail, by way of example only and with reference to the accompanying partly diagrammatic drawings, in which:

BRIEF DESCRIPTION OF THE DRAWINGS

FIGS. 2 to 11 show details of the cameras, FIGS. 4B and 4C showing a detail of FIG. 4 in different positions, FIG. 7B a view along the line B—B in FIG. 7A, and FIG. 10B a detail of FIG. 10A seen in the direction of the arrow 10B;

FIGS. 17 and 18 show operative diagrams of the cameras;

FIGS. 21 to 23 show constructional variants.

DESCRIPTION OF THE PREFERRED EMBODIMENTS

Figure 1A:
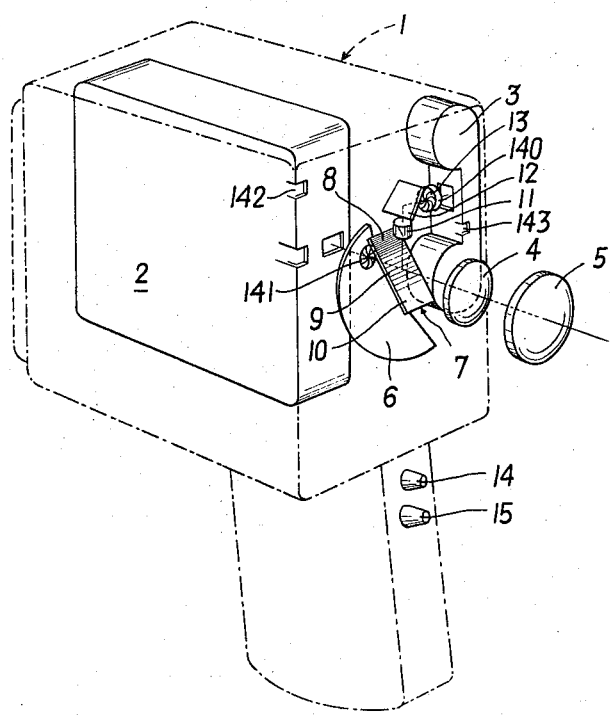
FIGS. 1A and 1B show two cameras only the essential parts of the housing and interior of the camera being shown in each case.
Figure 1B:
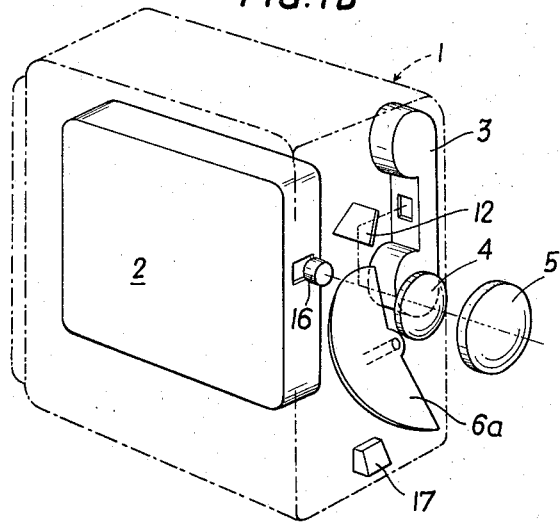

Referring to FIGS. 1A and 1B, a cinematographic film cassette 2 and a still film cassette 3 are accommodated in a camera 1. The light from the scene to be photographed passes through a front objective including lenses 4 and 5, upon whose optical axis is arranged a cine shutter with a shutter stop 6. Before or behind it there may further be a primary objective, which deflects the light at the imaging window of the cassette 2 when the shutter 6 is open.

A mirror 7 may be provided upon the axis of the objective 4, 5, to direct the light at the imaging window of the cassette 3. The mirror 7 has three zones of different reflectivity. Thus, a zone 8 gives 100 percent reflection, a zone 9 50 percent, whereas a zone 10 is wholly transparent. Instead, however, the mirror 7 may be completely removable from the light path. If the zone 8 of total reflection lies in the light path, the rays entering through the objective 4, 5 will be deflected through a primary objective 11 to a further deflecting mirror 12, which will then direct them through a photographic shutter 13 at the imaging window of the cassette 3. The objective 11 is so dimensioned as to yield upon the film of the cassette 3 an image that is suitably enlarged in relation to the cine film.

When the mirror 7 is movable only between a position outside the light path and a position for deflecting all of the light to the still film cassette 3, it is possible to provide, in addition to the means for moving the mirror, means for operating the objective to adjust the size of the image upon the film.

If the zone 9 of half-reflection lies in the light path in the camera shown in FIG. 1A, half of the incident light will reach each of cassettes 2 and 3. If, on the other hand, the surface 10 lies in the light path the still film will receive no light at all, and all the light rays will be incident upon the cine film.

FIG. 1A also shows two release buttons 14 and 15, one of which serves for actuating the shutter 6, and the other for actuating the shutter 13.

The camera shown in FIG. 1B is different in that recourse is had to a shutter plate 6a which is placed obliquely in the light path, has a mirror surface, and when suitably positioned supplies the incident light by way of the defecting mirror 12 to the image window of the cassette 3. On the other hand, when the shutter plate 6a is open all of the light from the scene will pass through a primary objective 16 on to the film sector falling within the imaging window of the cassette 2. In this case special conditions must be satisfied to prevent an undesired exposure of one film or the other.

In the camera shown in FIG. 1B there is a single release button 17 which effects the exposing of both the still and the cine film. The construction of such a release means will be discussed in more detail below.

Figure 2:
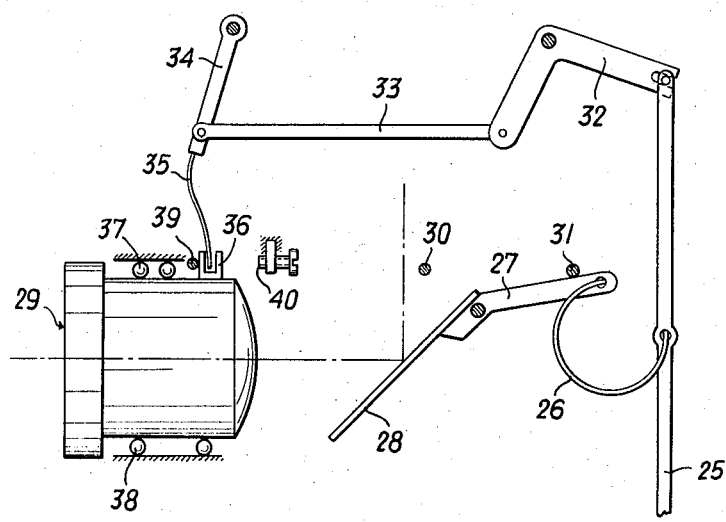

FIG. 2 shows the release means 14 and 15 of FIG. 1A. Between these two release buttons, loaded by respective springs 18 and 19, is located a switch-over device formed by a lever 20 which is slewable about a pivot 21 fixed to the housing. Owing to a tipping spring 22 the lever 20 always assumes one of two end positions. At the end facing away from the tipping spring 22 the lever 20 carries two angularly spaced caps 23 and 24, which always cover up one of the release means 14, 15 protecting it against actuation. In this way, after the reversal of the switch-over device 20–24, only one previously chosen release means 14 or 15 can be actuated, any mistaken actuation being out of the question.

Connected to the switch-over lever 20 is a plunger 25 which through a further tipping spring 26 turns a mirror 28, secured to a lever 27, in or out of the light path of an objective 29. Stops 30 and 31 fixed to the housing, are provided for limiting the movement of the lever 27. The mirror 28 is fully reflective and so corresponds to the mirror surface 8 of the mirror 7 (FIG. 1A).

Thus when the release means 14 or 15 is locked the mirror 28 is likewise switched over.

In order to eschew complicated primary objectives for adjusting the image formed by the objective 29 to the different image sizes of the cassette 2 or 3 (FIGS. 1A, 1B), the plunger 25 may be additionally adapted for adjusting the objective 29. For this purpose the plunger 25 is connected to a bell-crank lever 32, which transmits movement of the plunger 25 by means of a rod 33 to a lever 34. The lever 34 has attached to it a leaf spring 35, which fits into a bracket 36 of the objective 29. The objective 29 is axially slidable in ball guides 37, 38 and is brought by the leaf spring 35 up against one of the two stops 39, 40 according to the position of the plunger 25. The stop 40 is formed by an adjustable screw; the stop 39 too may advantageously be so formed. The same applies to stops 30 and 31.

Figure 3:
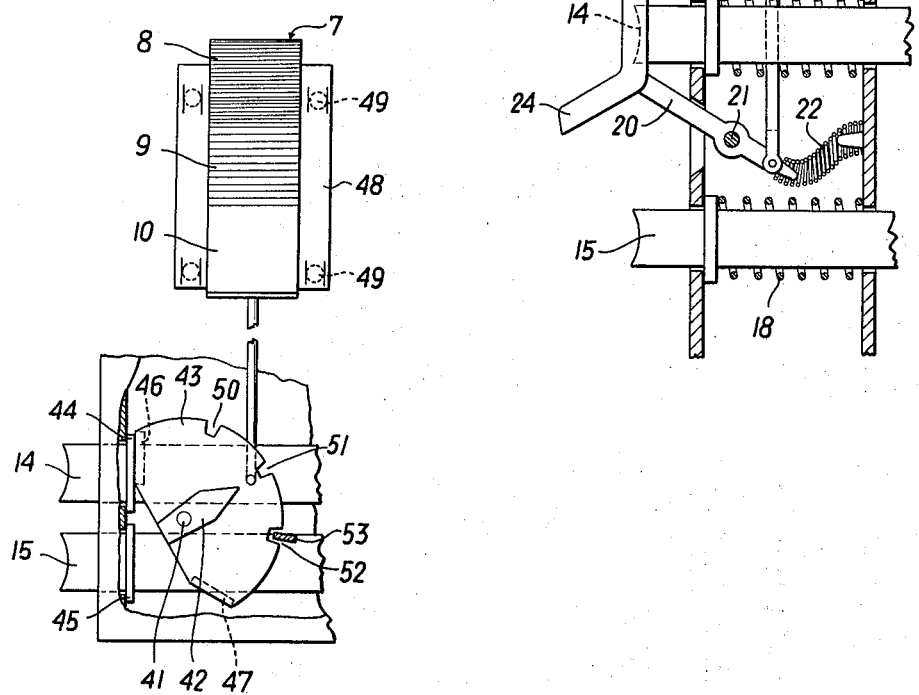

In FIG. 3 the release buttons 14 and 15 pass through one housing wall of the camera, while a shaft 41 carrying an actuating pointer-handle 42 projects through a housing wall at a right angle thereto. The shaft 41, upon which a locking plate 43 is non-rotatably fixed, can be turned by means of the pointer-handle 42. The two release buttons 14 and 15 have respective collars 44 and 45. The locking plate 43 is correspondingly provided with lips 46 and 47, which can be brought into the path of the collars 44 and 45, so that the associated release button 14 and 15 is immobilized. In FIG. 3 the lip 46 is applied against the collar 44, so that the release button 14 cannot be actuated. If the handle 42 is turned into a horizontal position the lip 46 is lifted off the collar 44, while the lip 47 has not yet reached the collar 45. The actuation of both release means 14 and 15 is therefore possible in this position, so that the user of the camera can simultaneously film and take a still photograph of the scene. If, on the other hand, the pointer-handle 42 is turned into a position where its point points obliquely down, the lip 47 will come up against the collar 45 so as to block the release button 15.

A rod 47 connects a slide 48 with the locking plate 43. The slide 48 slides in ball guides 49 and carries a mirror 7 (FIG. 1A). Consequently, if the handle 42 or the locking plate 43 is moved the mirror 7 will assume one of three positions, in which the surfaces 8, 9 and 10 respectively come into the light path of the objective. Obviously, the connection between the slide 48 and the locking plate 43 can also be effected indirectly, through other coupling means.

In order to fix the locking plate 43 in any of its positions, it has three catch recesses 50, 51 and 52 upon its edge. In each case one of these catch recesses co-acts with a catch salient 53, which is integral with the housing, being formed upon the housing wall transfixed by the shaft 41. For moving the locking plate 43 it is therefore necessary first to push in the handle 42 with the shaft 41 against a spring (not shown) towards the body of the camera, whereby the relatively short salient 53 is taken out of engagement with the relevant catch recess 50, 51 or 52. The pointer-handle 42 can now be turned into the desired position. This ensures the inevitable connection between the position of the mirror 7 and the blocking of the corresponding release means 14 or 15, any error being precluded.

In FIG. 4A the release buttons 14 and 15 are replaced by a single release button 17 (FIG. 1B). The release button 17 operates in the manner of a follower switch, such as is known in cameras for throwing in the general switch for the exposure control means and the subsequent switching on of the camera motor. Consequently, the release button 17 is accompanied by two contact bridges 54 and 55. These contact bridges face pairs of contacts 56 and 57, the contact pair 56 being closer to the contact bridge 54 than is the contact pair 57 to the contact bridge 55. It will be appreciated that in analogous manner to the springs 18 and 19 (FIG. 2) the release button 17 is likewise loaded by a spring (not shown).

When the release button 17 is used it can be moved to the right as seen in FIG. 4A until the contact bridge 54 interconnects the contacts 56. These contacts 56 are resilient and allow a further displacement of the release button 17 to the right. The closing of the switch contacts 54 and 56 is clearly perceptible to the user of the camera owing to the increasing spring pressure. As the release button 17 is moved farther to the right, the contact bridge 55 will end up by connecting the two contacts 57.

As in FIG. 3, the construction shown in FIGS. 4A to 4C is provided with a preselector switch, including the handle 42 and the shaft 41. In this case, however, a switch cam 58 is fixed upon the shaft 41. This switch cam 58 coacts with a cam-follower 59, which controls two switch lugs 60 and 61. The switch lug 60 is connected to a lead 62, and the switch lug 61 to a lead 63. The lead 62 runs to the photographic shutter (not shown: shutter 13 in FIG. 1A), while the lead 63 forms part of the circuit of the camera motor for operating the cinematrographic shutter 6. The point of the pointer-handle 42 co-acts with a scale on the outside of the camera, and is set in the position "C + P," shown in FIG. 4A, so that the camera user in switching on first sets into operation the cine shutter 6. If the release button 17 is moved on the photo shutter 13 is likewise released. For this purpose the cam 58 is so formed that the lead 62 is connected to a contact 57, while the lead 63 is joined to the contacts 56.

Furthermore, a mirror revolver 64 is connected, directly or indirectly through a gearing, to the shaft 41. It will be observed that the mirror revolver 64 has three apertures, into one whereof is fitted a wholly reflective mirror 65, and into another a half-reflective mirror 66. Into the third aperture 67 may be inserted a transparent glass plate, or else such a plate may be altogether omitted. The mirrors 65 and 66 correspond to the mirror surfaces 8 and 9 in FIGS. 1A and 3. The shaft 41 may advantageously connected once more with a catch means (c.f. FIG. 3), which fixes the correct position of the mirror revolver 64 or of the cam 58, and prevents intermediate positioning.

As already mentioned, when the pointer-handle 42 is set as in FIG. 4A the cine and still exposure are both possible. In the position of the pointer-handle 42 shown in FIG. 4C, however, the point of the handle 42 indicates the letter "P" on the scale provided upon the camera. In this position the switch lug 60 and so the lead 62 is connected to the contacts 56, so that the still-picture shutter is released as soon as these contacts 56 are touched by the contact bridge 54. On the other hand, the driving motor of the cine shutter cannot be actuated, because the switch lug 61, which is connected to the lead 63, is insulated. The switch-over of the lead 62 to the lead equipped with the contacts 56 as shown in advantageous inasmuch as owing to this the photo shutter is affected already when the contacts 56 touch the contact bridge 54. Thus the camera user need not press in the release button 17 so deep as to make the contact bridge 55 touch the contacts 57 as well. It will be appreciated, however, that an arrangement is also conceivable where only the switch 61 is opened in resetting to "P," whereas the lead 62 stays connected to the contacts 57, as is the case in FIG. 4A.

In using the camera for filming it would in itself be enough for the user to move the release button 17 so far only as to make the contact bridge 54 interconnect the contacts 56. In principle this could happen in a position of the switch shown in FIG. 4A as well. In order, though, to preclude an undesired still exposure, a further position of the pointer-handle 42 according to FIG. 4B may be provided, where the lead 62 is insulated from the contacts 57, whereas the lead 63 is connected to the contacts 56 through an additional contact co-operating with the switch lug 61.

If use is made of a mirror shutter 6a lying obliquely in the optic path as shown in FIG. 1B, there is a problem that a still exposure is possible only if the mirror shutter occupies a position where it deflects the light-rays to the still-film cassette 3. The condition must, therefore, be satisfied whereby the photo shutter 13 is not released at any other time. FIG. 5 shows such a device, the parts having the same function bearing the same reference symbols as in the previous Figures.

As in FIG. 4, there is provided a sequence switch with the release button 17. The shutters 6a and 13 assume the position shown in FIGS. 1B and 1A respectively. It will further be seen that the mirror shutter 6a is fixed upon a shaft 68, by which a slide contact 69 is synchronously and simultaneously rotated. In the path of this slide contact 69 there is provided a slip-ring segment 70, connected to the electrically operated still-picture shutter 13.

As has already been described with reference to FIG. 4, if the release button 17 is moved to the right the contact bridge 54 is applied first to the contacts 56, whereby the motor circuit for the drive of the shutter 6a is supplied with power. As the release button 17 moves on the contact bridge 55 is also brought in contact with the contacts 57. The still-picture shutter 13, however, is not released until the mirror shutter is in the right position, in which the light coming from the objective is deflected to the still-picture shutter 13. At the same moment as this happens the contact 69 touches the slip-ring segment 70, so that the contacts 57 being interconnected, current is supplied to the still-picture shutter 13 which is released. The construction of this shutter 13 is known as such and does not form part of the invention.

In connection with the construction shown in FIG. 5 it will be seen that here, too, a double-throw switch may be provided that is similar to the switch shown in FIGS. 4A to 4C, but without a mirror revolver 64, whereby the camera can be switched on for filming, still photography or both.

A mechanical solution similar to the electrical one shown in FIG. 5 is shown in FIG. 6. Here again the reference symbols of the already described figures are employed for the parts having the same function. For the sake of clarity, however, the still-film cassette 3 is not represented in FIG. 6. It lies behind the mirror 12 and the photo shutter 13.

Unlike the previously described arrangements, a short push-rod 71 is provided on the release button 17. This push-rod is guided in a sleeve 72, which carries the contact bridges 54 and 55. The push-rod 71 is supported by a compression spring 73, arranged in the sleeve 72. If the release button 17 is moved to the left as seen in FIG. 6 the push-rod 71 will exert a pressure upon the spring 73 and thus elastically transmit this pressure to the sleeve 72, which in the absence of counter-pressure will also move to the left. Thus the contact bridge 54 will first be applied to the contacts 56, which bring under power the motor (not shown) for the drive of the mirror shutter 6a or of the shaft 68.

Fixed upon the shaft 68 is a blocking plate 74, which rotates synchronously with the shutter 6a. This blocking plate 74 has a recess 75. A locking salient 76 upon the sleeve 72 is adapted to co-act with the blocking plate 74. This salient 76 is interposed into the path of the blocking plate 74 when the sleeve 72 is moved, and the former blocks the further movement of the salient 76 and so of the sleeve 72, unless the recess 75 faces the locking salient 76. This is not the case unless the mirror shutter 6a has assumed the position in which it deflects the light coming from the objective to the primary objective 11, the mirror 12 and the shutter 13. Only then, therefore, does the recess 75 clear the way to the locking salient 76, so that the sleeve 72 can be moved until the contact bridge 55 interconnects the contacts 57, whereupon the still-picture shutter 13 is released. To obviate the situation where the hesitant movement of the release button 17 by the camera user leaves the locking salient 76 stuck in the recess 75 of the blocking plate 74, the locking salient 76 may be equipped with sloping surfaces 77 and 78. If an edge of the recess 75 strikes against the oblique surface 78 the sleeve will again be moved to the right; if, on the other hand, the edge strikes against the oblique surface 77 the sleeve 72 moves to the left.

When the mirror shutter 6a is used the release of the still-picture shutter 13a as such can take place straight-away at the time of the passage of the mirror face through the optical path. This time is normally about 1/40 of a second. This time, however, may be too short for the simultaneous slewing-in of a mirror. In order, therefore, to gain time for slewing in the mirror, a construction is described below with reference to FIGS. 7A and 7B enabling to immobilize the transport arrangement for the cine film during one revolution of the mirror shutter diaphragm 6a, which is not represented in these figures.

Figure 7A:
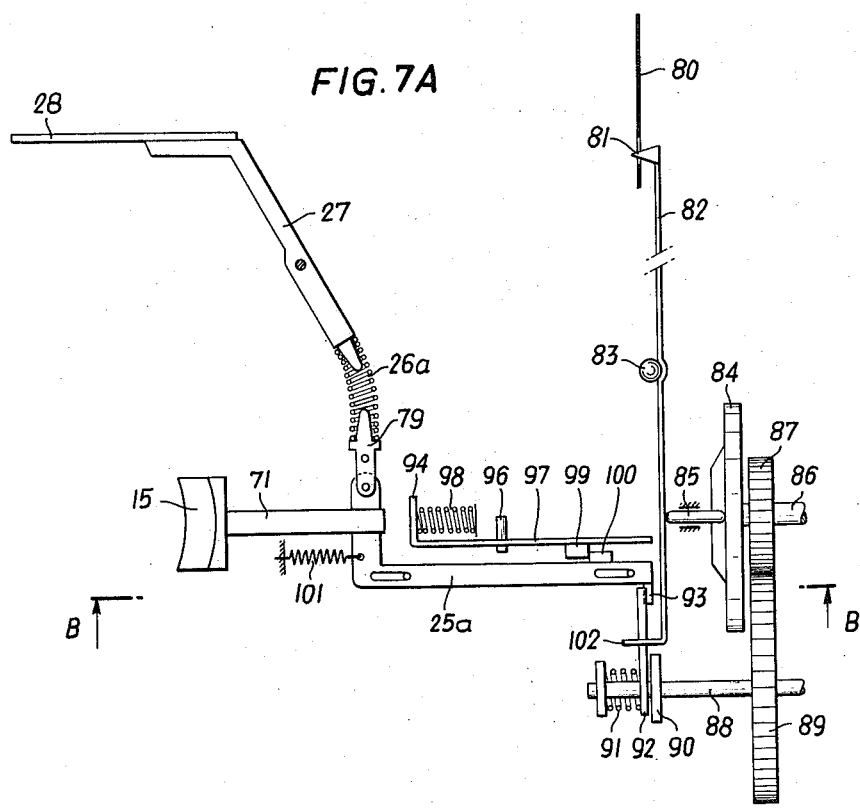
Figure 7B:
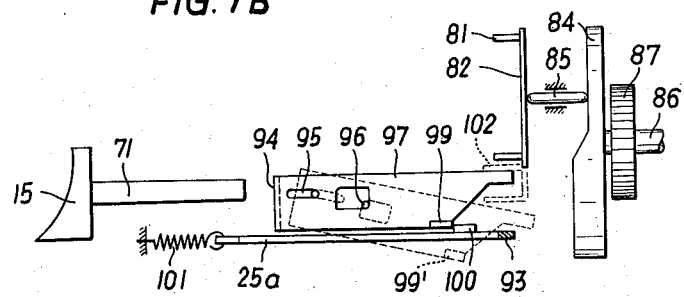

Of the parts of the construction according to FIGS. 7A, 7B described so far are shown the still-picture release means 15 and the slewable mirror 28 fixed to the lever 27. The tipping spring 26 of FIG. 2 is replaced by a helical tipping spring 26a is operated by a double-armed lever 79, whose other end is engaged by a thruster 25a. Unlike, however, the construction in FIG. 2, this thruster 25a is not connected to a double-throw switch, and is actuated directly by the release button 15 itself, as will be presently described.

The cine film 80 shown in FIG. 7A is transported by a gripper with gripping teeth 81 upon a gripping plate 82. For this purpose there is provided a transport stroke cam, which is known as such, is not shown, and which moves the gripping plate 82 up and down as seen in FIG. 7B in ball guides with ball-bearings 83. To control the engagement of the gripping teeth 81 in the perforations of the film 80, there is provided an engagement stroke cam 84, as is usual in gripper drives. This engagement stroke cam 84 co-acts with a cam follower 85, which is guided in bearings (not shown) and transmits the control motion to the gripping plate 82. The engagement stroke cam 84 is driven by a main shaft 86, upon which is seated a pinion 87. This pinion 87 drives a gear wheel 89 fixed upon a shaft 88. A friction disc 90 is further connected with the shaft 88, and a locking lever 92 is applied by a pressure spring 91 to the friction disc 90. This locking lever 92, left to itself, would resolve synchronously with the shaft 88, but its movement is prevented by a locking tooth 93 upon the thruster 25a. So long as the locking lever 92 bears against the locking tooth 93, this locking lever 92 remains outside and below the path of the gripping plate 82.

If now the release button 15 is moved up or to the right as seen in FIGS. 7A and 7B its thruster 71 will encounter a bent-off part 94 of a plate 97, which is slidable in a slot 95 (FIG. 7B) and rotatable about a pivot 96. This plate 97 is loaded by a spring 98. The plate 97 has further a tappet 99, in whose path lies a salient 100 of the thruster 25a. As a result the movement of the release button 15 is transmitted by the plate 97 to the thruster 25a.

If now the thruster 25a is moved against the action of a returning spring 101, then the tooth 93 is withdrawn from the path of the locking lever 92. Thus the lever 92 is enabled to take part in the rotation of the shaft 88, but in the case where the gripping tooth 81 fits into the perforation of the film 80 it will come up against an angled projection 102 of the gripping plate after a ¾ turn. Not until the gripping tooth 81 is withdrawn from the perforation hole by the engagement stroke cam 84 does the plate 82 open the way for one revolution of the locking lever 92 through being turned about the balls 83. This places the locking lever 92 in front of the plate 82, and prevents a renewed engagement of the gripping teeth 81 in the perforations of the film 80. This blocking of the gripping plate 82 in the withdrawn position of the gripping teeth 81, however, lasts only until the locking lever 92 is removed from the path of the plate by the continued rotation of the shaft 88. The duration of the blockage depends on the reduction ratio given by the gears 87, 89 and on the size of the plate 82, or of the lever 92.

To prevent the situation in which, when the release button 15 is actuated, the locking tooth 93 stays permanently withdrawn from the path of the locking lever 92, so that the latter continues to interrupt the movement of the gripper, an arrangement has been provided, which is known for single exposure release in cameras. Such a construction is described with reference to FIGS. 7A, 7B but will be understood that other constructions suitable for the single exposure release may likewise be employed.

When the plate 97 is moved against the compression spring 98 the end of the plate 97 facing towards the gripping plate 82 is brought into the range of movement of the gripping plate 82. Since the locking lever 92 prevents only the gripping movement of the gripping plate 82, but not its transport movement effected by the transport stroke cam (not shown), the gripping plate 82 will come up in its downward movement against the end of the plate 97. As a result the plate 97 turns about the pin 96, which is passed through the slot 95, until it has assumed the position shown in dashed lines in FIG. 7B. At the same time the follower 99 assumes the position 99', where it lies outside the path of the salient 100. Consequently, the thruster 25a can again be moved by the action of the returning spring 101 back into its starting position, the locking tooth 93, being returned into the path of the locking lever 92. During this movement the mirror 28, slewed in front of the film 80 by the displacement triggered off by the release means 15, is likewise returned into the position shown in FIG. 7A. Various constructions have already been disclosed for preventing the movement of the gripper, more particularly in connection with the changes of frequency in cine films. Suitably adapted constructions of this kind could also be used instead of that shown in FIGS. 7A and 7B.

Moreover, conventional rotary shutters with an adjustable clear sector could likewise be employed in connection with the invention. Such an adjustable rotary shutter has two diaphragm sectors 103 and 104 (FIG. 8), whereof, for instance, the sector 103 may be connected with a hollow shaft 105, while the sector 104 is connected with a coaxially mounted shaft 106. A sleeve 107 is axially slidable upon the hollow shaft 105 and can be actuated for this movement by a handle 108 outside the camera housing. On the inside of the sleeve 107 there is a comparatively steep helical groove, in which is guided a block fixed to the hollow shaft 105. If the sleeve 107 is axially displaced the hollow shaft 105 is rotated, so that the sectors 103 and 104 are moved relatively to each other in the known way, and a larger or smaller aperture is formed between these two sectors. In this way the time of exposure can be set.

Now the construction according to FIG. 8 is so contrived that the shutter formed by the sectors 103 and 104 alone determines the exposure time both for the cinematographic film in the cassette 2 and for still-picture film in the cassette 3. For the switch-over from filming to still photography use is made of the mirror 28a, which is moved from the position shown in FIG. 8 by dashed lines, where it releases the light beam from cine photographs, into the position shown in full lines in which it deflects the light-rays coming in through the objective over the mirror 12 directly and without the interposition of a further shutter to the imaging window of the cassette 3. Thus the mirror 28a acts in this case as a supplementary shutter, and the switching-over of the mirror can be effected by the double-throw switch upon the shaft 41 (c.f. FIGS. 3 to 4C). In addition, there may be mounted upon the shaft 41 a half-reflecting mirror 110, which corresponds to the mirror surfaces 9 or 66 in FIGS. 3 and 4A respectively, and makes possible an equal exposure of the cine and still-picture films. It is also conceivable to provide upon the shaft 41 in the manner of a revolver a plurality of such mirrors of differential reflectivity, for varying the distribution of light between the cine and still-picture films as desired. This may be useful for taking differences in light sensitivity into account.

The construction shown in FIG. 9 is similar to that of FIG. 8, but a mirror shutter is substituted for a deflecting mirror. This mirror shutter is the shutter shown in FIG. 8. Unlike it, however, one of the two diaphragm sectors, namely the sector 103a, has a mirror surface. The sector 104 may but need not have a mirror surface.

If the sector 104 is unreflective and the two sectors 103a and 104 are superimposed, then the sector 104 will completely cover up the mirror sector 103a, so that no light can reach the deflecting mirror 12 and the still film. If, however, the sleeve 107 is so moved by means of the handle 108 that the sectors 103a and 104 overlap only partly or not at all, the still film will be exposed for a shorter or longer time when the shutter rotates according to the portion of the mirror sector 103a exposed to the light from the scene. Since the aperture angle between the two sectors 103a and 104 varies simultaneously, the exposure time can thus also be changed for the cine film contained in the cassette 2.

In order to prevent inadvertently exposing the cine film when a still picture is being taken, for which purpose the release means for the shutter must be suitable for single exposure, there are provided ancillary shutter leaves 111 and 112, which are longitudinally slidable in guides (not shown) and can be brought into the optical path. In the position illustrated in FIG. 9 the ancillary shutter 111 is in the optical path of the cine film, so that its inadvertent exposure is not possible. On the other hand, the ancillary shutter 112 leaves the light path clear for the still-picture film. If, however, the shaft 41, on which the cam 113 is seated, is turned clockwise through 90°, the raised portion of the cam 113 will displace the ancillary shutter 112 into the optical path leading to the still film, whereas the ancillary shutter 111, which, like the ancillary shutter 112, is applied to the cam by the load of a spring (not shown), will be moved out of the optical path to the cinematographic film. If the shaft 41 is turned through 180° from the position shown in FIG. 9 the raised part of the cam 113 will pass out of the range of either ancillary shutter 111 or 112, so that both the shutters will clear their corresponding optic paths, and simultaneous film and still exposures will be possible.

It is possible to dispense with one of the two ancillary shutters, say, shutter 112. In this case the sectors 103a and 104 will act as a shutter for the still film.

For obtaining longer exposure times for the still film it is also possible to give mirror surfaces to both sectors 103a and 104. In this case the shortest exposure time will be obtained when the two sectors 103a and 104 overlap, for then practically only the sector 14 is active. If, however, the two sectors 103a and 104 are separated the exposure time will be increased for the still-picture film, whereas that of the motion-picture film is decreased.

Figure 10A:
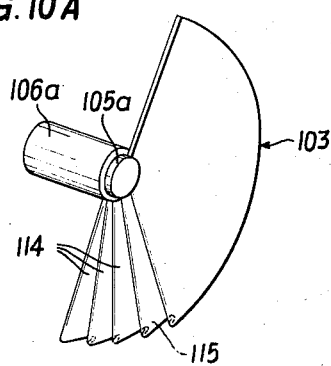
Figure 10B:
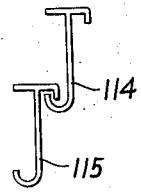

FIGS. 10A and 10B show a variant of the mirror shutter where one sector 103 is wholly reflective. In order to reduce the time of exposure there are provided sector blades 114 and 115. These blades have the cross section shown in FIG. 10B. The lowest blade is connected with the adjustable shaft 105a, which this time lies inside, while the remaining blades 114 are fixed to the shaft 106a.

If a long exposure time for the still-picture film is desired the blades 114 and 115 are stacked over one another and occupy the angular space of only a single blade of the mirror surface of the sector 103. If, however, the time of exposure is to be reduced the shaft 105a is turned relative to the shaft 106a, whereby it first hooks up the blade 115 adjacent to the blade 114 in angular position according to the sense of rotation and pulls it along. All the remaining blades are similarly formed, so that the blades 114 are successively hooked up and are pulled like a curtain over the mirror surface of the sector 103. In being reset, however, the blades come up against a substantially T-shaped extension of the adjacent blade, so that the compartments formed by the blades 114 and 115 are again telescoped.

Figure 11:
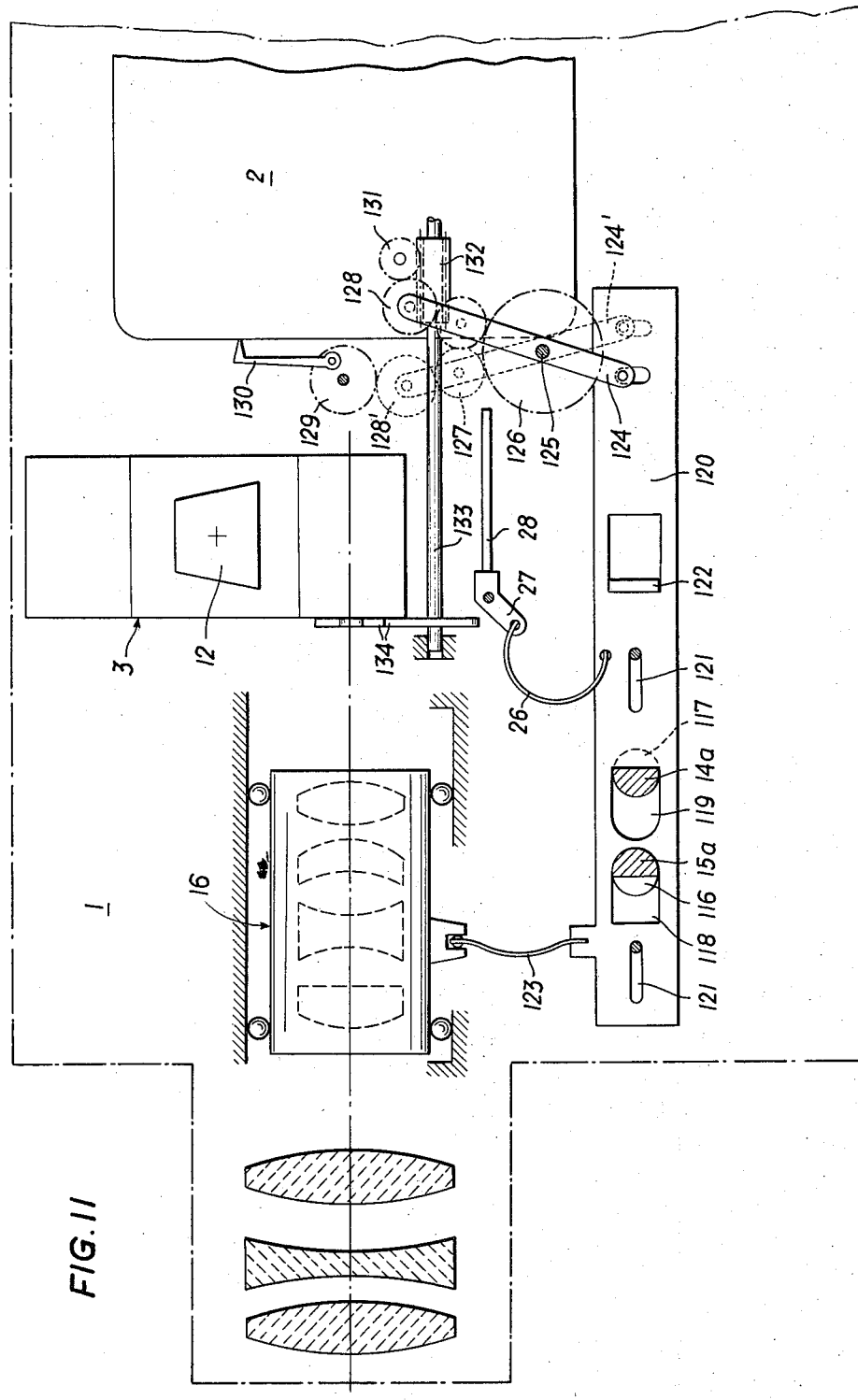

In FIG. 11 a camera is shown which is provided with release pins 14a and 15a. These pins 14a and 15a are shown in section and have recesses 116 and 117 on their sides facing away from each other. The release pins 14a and 15a pass through stirrup-shaped openings 118 and 119 in a switch-over coupler 120. This switch-over coupler is guided by means of pin-slot guides 121 and has a die-stamped bent lug 122, which projects through the camera housing to the outside and serves for actuating the coupler 120.

The stirrup-shaped openings 118 and 119 serve for locking the two release pins 14a and 15a, in the position shown the straight edge of the opening 119 fitting into the recess 117 of the release pin 14a, so that this release pin 14a is prevented from moving. At the same time, however, the straight edge of the opening 118 sets free the release pin 15a.

A leaf spring 123 connects the switch-over coupler 120 to the primary objective 16, which is slidable between two end positions defined by stops in the same way as has been described with reference to the objective 29 in FIG. 2. Further, there is again provided the tipping spring 26, by means whereof the tilting mirror 28 can be swung into the optical path through the lever 27.

In addition, an end of a two-armed lever 124 is hinged to the coupler 120. This lever 124 pivots about a shaft 125, fixed to which is a driving gear 126 for the camera gearing. From the driving gear 126 the drive is transmitted through an intermediate gear 127 to the coupling gear 128, which is mounted together with the intermediate gear 127 upon the lever 124, and drives either the transport gearing for the still-picture film or that for the motion-film according to the position of the coupler 120. In the position of the lever 124' shown in dashed lines the coupling gear 128' meshes with a pinion 129, connected to which is a gripper 130 for the transport of the motion-picture film. Thus if the release pin 14a is actuated the drive is transmitted from the input gear 126 to the gripper 130.

In the position of the lever 124 and/or of the coupling gear 128 shown in full line the latter is in engagement with an intermediate gear 131, which transmits the drive through a gearing to a worm 132. The worm 132 is mounted fixed upon a shaft 133, which has a drive 134 for the still-picture film at its other end. This drive may be of a conventional kind; for instance, it may consists of a Geneva motion.

As shown in FIG. 1A, the light-rays passed through the objective 4, 5 with the aid of the mirror 7 are directed at a further deflecting mirror 12, which deflects them through an automatically regulated diaphragm 140 to the imaging window of the cassette 3. Correspondingly to the diaphragm 140 in the optical path of the still film contained in the cassette 3, a diaphragm 141 is provided in the optical path of the motion-picture film of the cassette 2.

Figure 12:
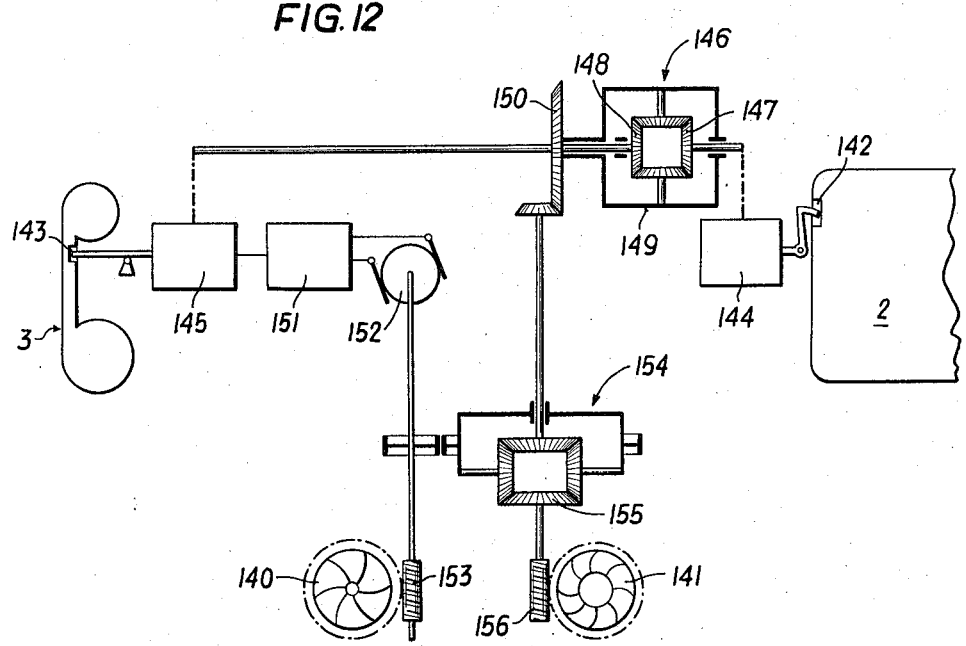
FIGS. 12 and 13 show two further cameras.
Figure 13:
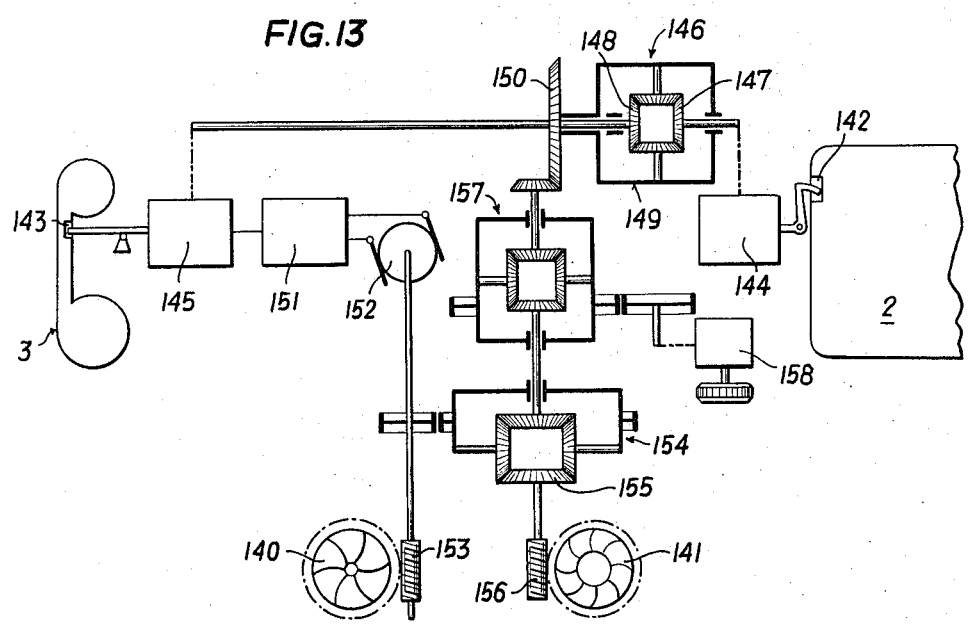

The cassettes 2 and 3 have in the usual way recesses 142 and 143, which indicate a measure of the sensitivity of the film that the cassette may contain at the time. It will be appreciated that these film sensitivites may differ from each other. Usually the recesses 142 and 143 are sensed by a sensor device (not shown in FIG. 1A) and a corresponding value is communicated to the diaphragm 140 and 141 by a regulating system (not shown). FIGS. 12 and 13 show how this can be done. The various means are here shown diagrammatically.

FIG. 12 shows the cassettes 2 and 3 with the recesses 142 and 143, Whilst the recess 142 is sensed by a sensor device 144, the same is done by a sensor device 145 with the recess 143. The outputs of the sensor devices 144 and 145 are supplied to a subtraction means in the form of a differential gearing 146. In this differential gearing 146 an input bevel gear 147 is driven from the output of the sensing device 144, while the other input bevel gear 148 receives its drive from the sensor device 145. The output is delivered through a planetary gear cage 149, which is connected to an output bevel gear 150.

The output of the sensor device 145 is additionally supplied to the diaphragm control system 151. This control system 151 may be realized either mechanically or electrically. In either case it will include means for measuring light intensity, etc. At the output of the control system 151 there is a motor 152, which may be of any suitable design. Shown in FIG. 12 is a rotor motor, but it may as well be some other motor of known type.

Through a worm 153 or the like the motor 152 operates only the diaphragm 140. Although the diaphragm 140 is represented as an iris diaphragm, this may be any other kind of diaphragm. For example, the motor 152 could consist of a galvanometer actuating a diaphragm vane.

The motor 152 also drives an input of a further subtraction device 154. Thus all the data determined by the control system, especially the lighting intensity, etc., but also the film sensitivity sensed from the cassette 3, are fed into the differential gearing 154. On the other side the output of the differential gearing 146 is supplied to the differential gearing 154 through the output gear 150. This yields the following calculation:

If it is assumed that the sensor device 144 has sensed a film sensitivity F 1, while the sensor device 145 has sensed a film sensitivity F 2, this must produce at the output of the subtraction device 146 the output signal

F 2 − F 1

On the other hand, the film sensitivity F 2 is also fed to the control system 151, which adds to it the control value R. Thus at the output of the control system 151 will appear

F 2 + R.

The above algebraic sums are then subtracted from each other in the subtraction device 154:

F 2 + R − (F 2 − F 1), the term F 2 cancelling out upon the removal of the brackets, which yields a signal

R + F 1 as the output value. This output value is fed by the output gear 155 of the differential gearing through a worm 156 or the like to the second diaphragm 141.

It will be seen that it is thus possible with a single control system 151 and a single driving aggregate 152 to drive two diaphragms 140 and 141 so that each of them will yet assume the correct position.

FIG. 13 shows a switching arrangement similar to that in FIG. 12. It is, therefore, superfluous to describe the parts already known from FIG. 12. The difference from FIG. 12 is that there is provided a further differential gearing 157, whose inputs are connected to the output of the subtraction device 146 and to an adjusting means 158. The arrangement here may be such that the difference between the two shutter times is determined in the adjusting means 158 and only the difference is fed into the differential unit 157. If the exposure time for the shutter belonging to the diaphragm 140 has already been taken into consideration by the control system 151, this term again cancels out in algebraic summation at the output of the subtraction device 154, so that only the timing of the shutter corresponding to the diaphragm 141 is taken into account in setting this diaphragm.

Figure 14:
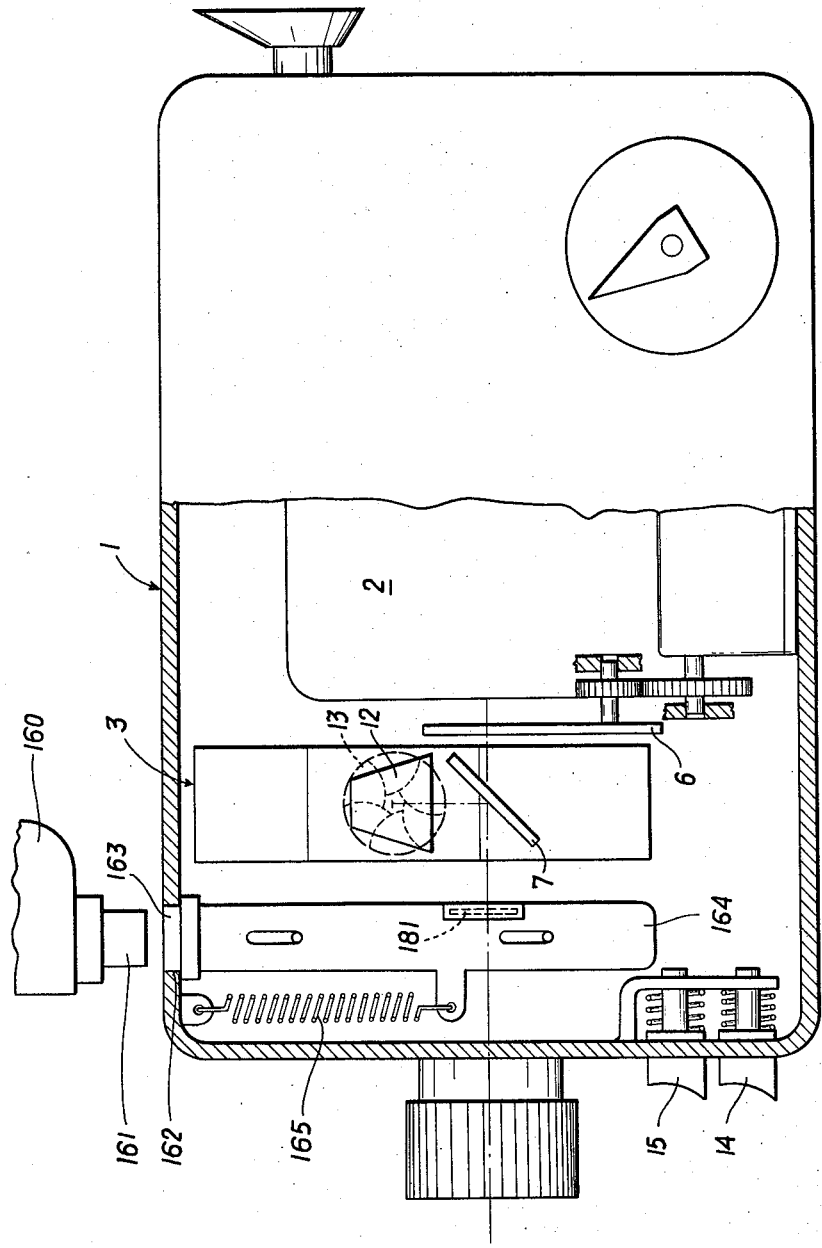
FIG. 14 shows another camera in partial section.

In FIG. 14 the camera 1 has two release means 14 and 15, the first of which actuates the shutter 6, and the second the shutter 13. Let it be assumed that in the usual way the still-picture film contained in the cassette 3 is a daylight film, which is not to be exposed if a lamp 160 is fitted on to the camera 1. For the reception of the base 161 of the lamp 160 the camera has a socket 162, which is closed by the end part 163 of a slide 164. The fact that the slide 164 blocks with its end part 163 the socket 162 largely prevents dust and the like from penetrating inside the camera through the socket 162.

The slide 164, which is connected in a known way to a conversion filter 181 placed in the optical path according to FIG. 14, is guided by means of pin-and-slot guides and always kept in its top-most position by a spring 165. Only when the lamp base 161 has been fitted into the socket 162 is the slide 164 displaced against the spring 165, the conversion filter 181 being taken out of the optical path. At the same time the lower end of the slide is moved in front of the push-rod connected to the release button 15 and blocks this against displacement to the right as seen in FIG. 14. In this way when the lamp 160 is inserted the exposure of the daylight film in the cassette 3 by light of inadequate temperature colour is automatically prevented.

Figure 15:
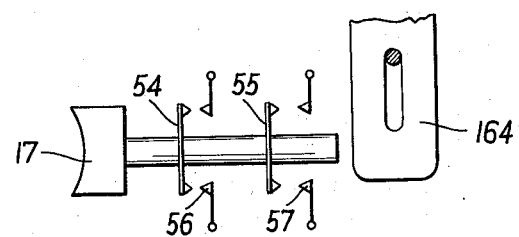
FIGS. 15 to 18 give details of the cameras.

FIG. 15 shows an arrangement in which, instead of two release means 14 and 15, there is provided the release button 17 which actuates the shutters 6 and 13 through the contact bridges 54 and 55 and the associated contacts 56 and 57 fixed to the apparatus. The lower end of the slide 164 is shown in the position occupied after the insertion of the lamp base 161 (FIG.

14). If it is now borne in mind that a conversion filter for adjusting the artificial light to the spectral sensitivity of the daylight film placed behind the shutter cannot be introduced into the optical path of the shutter, associated with the contact bridge 55 and the contacts 57, FIG. 15 shows that the slide 164, whence the lamp 160 has been inserted, projects into the path of the push-rod of the release means 17 enough to enable the contact bridge 54 to span the contacts 56, while preventing the end of the slide 164 from spanning the contacts 57 by means of the contact bridge 55. Thus the arrangement illustrated in FIG. 15 likewise ensures that the daylight film is not erroneously exposed to artificial light.

Figure 16:
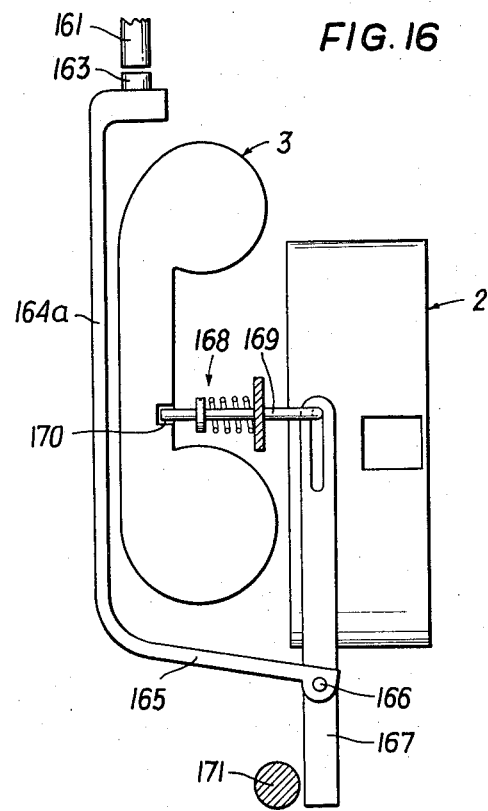

The 8mm films at present on the market are usually intended for artificial light, whereas the still-picture films are daylight films. It is, however, conceivable that the market situation will change. The codes in the form of recesses on a cassette wall have already been standardized, so that a recess in a certain position on a cassette indicates that it contains an artifical-light film, whereas the absence of such a recess is characteristic of a daylight film. FIG. 16 shows the case of a cassette 3 with such a recess. It will be appreciated, however, that the arrangement shown in FIG. 16 can be realized also for a cassette 2, and it is likewise possible to provide an embodiment equivalent to the construction shown in FIG. 16 for both cassettes 2 and 3.

Referring to FIG. 16, the lamp base 161 and the salient 163 of a slide 164a have already been described. The slide 164a differs from the slide 164 as previously described in that it has in its lower part a bent lug 165 carrying a pivot 166 about which slews a locking lever 167. The slewing motion of the locking lever 167 is controlled by a sensor device 168, which consists of a sensing pin 169 loaded by a spring. The presence or absence of a recess 170 in a wall of the cassette 3 is ascertained by means of the sensing pin 169, the recess 170 indicating that the cassette 3 contains a film for artificial light. The absence of this recess 170 shows on the other hand, that the cassette 3 contains a daylight film.

A release pin 171 lies in the range of the locking lever 167, shown in section in FIG. 16. The locking lever 167 is controlled by the slide 164a and by the sensor device 168, in the manner of an AND switch. Thus the locking lever 167 does not enter the path of the release pin 171 (like the lower end of the slide 164 the path of the releaser that is to be blocked in FIGS. 14 and 15) unless the lamp 160 has been inserted with its base 161 into the camera 1, thus shifting the slide 164a downwards, and there is no recess 170, i.e. the cassette 3 contains a daylight film. In this case it is clearly necessary to prevent mistakenly exposing this film to the artificial light of the lamp 160.

Although in the position shown in FIG. 16 the lamp 160 is secured to the camera by its base 161, the presence of the recess 170 causes the sensing pin 169 to move to the left, so that the locking lever 167 has been turned clockwise out of the path of the release pin 171 by the sensing pin 169.

In principle it is also possible for a camera to lack a conversion filter for adjusting the colour temperature of daylight to that of an artificial-light film, in which case the illustrated mechanical AND switch should be constructed in reverse. In such a case the slide 164a and/or the locking lever 167 should be so designed that when the slide 164a is moved up the locking lever 167 enters the range of the release pin 171. Owing to the large amount of light normally available in daytime, however, this case is a purely theoretical one.

Figure 17:
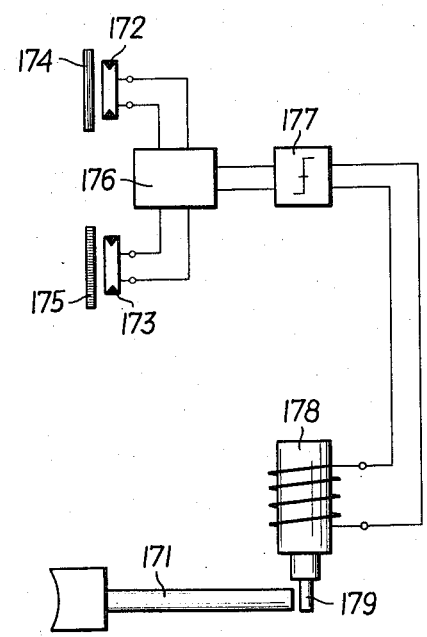
Figure 18:
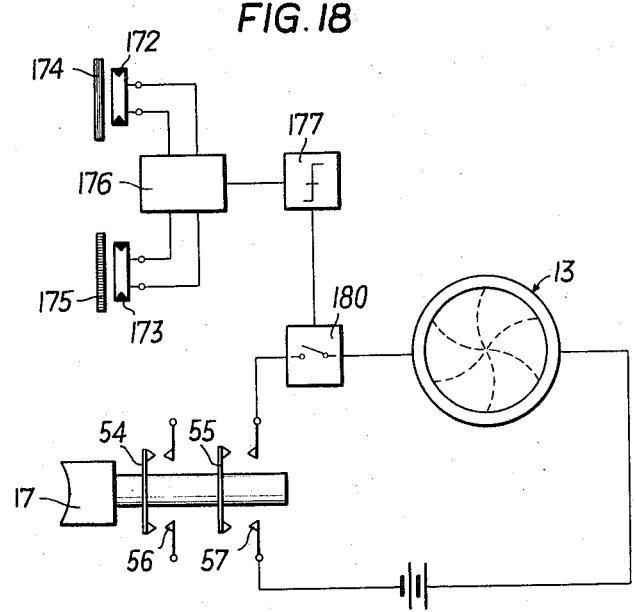

FIGS. 17 and 18 show that the control of the blocking means for the release means need not necessarily involve the base of the lamp. On the contrary, colour-temperature meters are known that can also be used for controlling the blocking means.

Such a colour-temperature meter consists essentially of at least two photo-electric instrument transformers 172 and 173 preceded by a red and a blue filter 174 and 175 respectively. It is known, however, that instead of using filters, the photo-electric transformers 172 and 173 may be so contrived as to be particularly sensitive to a corresponding spectrum of visible light.

The photo-electric transformers 172 and 173 are connected to a comparison device 176, which can be constructed for colour-temperature meters in a known way. To the output of this comparison device 176 is connected a threshold switch 177, which digitalizes the signal coming from the comparison device 176. Thus current to a solenoid 178 is switched on or off according to the signal received from the threshold switch 177. The solenoid 178 co-acts with an armature, which has a blocking extension 179 moved into or out of the path of the release pin 171 according to the signals coming from the colour-temperature meter or the comparison device 176. The detailed construction of the release means, be it according to FIG. 14 or 15, is not relevant here. It is further conceivable to provide a sensor device 168 which delivers signals in such a way that the threshold switch 177 lies at the output of an AND switch, whose inputs are formed by the outputs of the sensor device and the comparison device 176.

FIG. 18 shows an arrangement similar to that of FIG. 17, which shows that the blocking device need not necessarily be mechanical. The blocking device shown in FIG. 18 coacts with the release means according to FIG. 15 and consists of a switching arrangement 180 connected in series with the contacts 57 and controlled by the threshold switch 177. Thus the switch 180 connected in series with the release switch with the contacts 57 and realized electronically, by a relay or the like, is opened or closed according to the switching conditions of the threshold switch 177. In any event the mistaken exposure of a film to the picture light of inadequate colour temperature is thereby prevented. The threshold switch 177 and the switching arrangement 180 may be of any construction. For instance, both these devices may be jointly realized by means of a thryistor.

Figure 19:
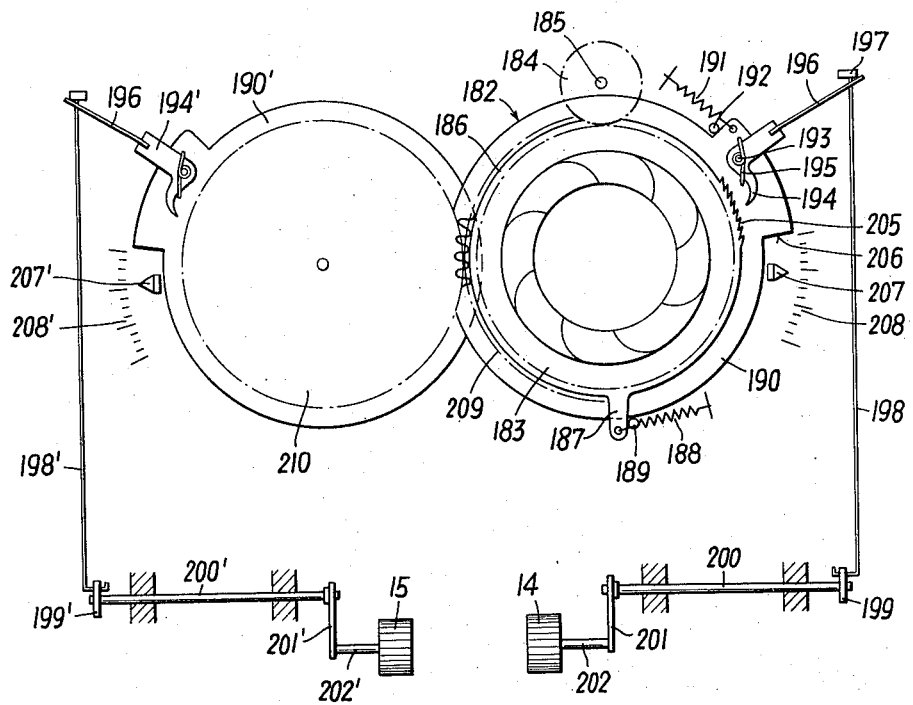
FIGS. 19 and 20 show a camera in front and side elevation.
Figure 20:
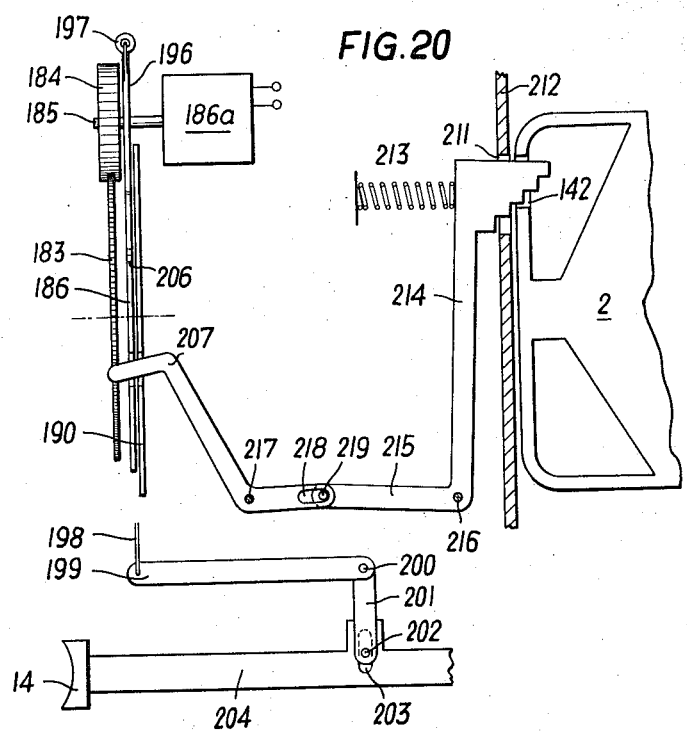

In the arrangement shown in FIG. 19 it is found sufficient to have a single diaphragm, which may be located, for instance, between the two lenses 4 and 5 or between the lens 4 and the mirror 7. This diaphragm has in a known way two setting rings, the setting ring 183 being equipped on its periphery with teeth which mesh with a pinion 184 upon a shaft 185. The shaft 185 is the motor shaft of a diaphragm servo motor 186a (FIG. 20). The aperture of the iris diaphragm 182 is set by means of the diaphragm servo motor 186 through a control connection according to the brightness of the scene, as well as to further exposure factors, except for the film sensitivity.

The second diaphragm setting ring 186 of the iris diaphragm 182 serves in a known way for setting the film sensitivity. This second setting ring 186 has upon its underside a salient 187 which is engaged by a tension spring 188 urging it against a fixed stop 189. Normally the film sensitivity setting ring 186 will, therefore, be in the position shown in FIG. 1.

A freely rotatable ring 190 is mounted coaxially with the two rings 183, 186. The ring 190 is also placed under the action of a returning spring 191, and is pulled by the force of this spring 191 against a stop 192.

On the ring 190 a ratchet 194 is pivoted upon a pin 193 under the action of a loop spring 195. The ratchet 194 carries upon its end facing away from the ratchet tooth a comparatively strong leaf spring 196. At the end of the leaf spring 196 there is an eye 197 (FIG. 20), through which a connecting rod, cord 198 or the like is passed. The bottom end of this connection 198 is fixed to a lever 199, seated on a shaft 200. At its other end the shaft 200 carries a lever 201, which projects downwards and at whose end is fixed a pin 202.

As shown in FIG. 20, this pin 202 may engage, for example, a slot 204 in a release pin 204, which carries on its front end the release button 14.

If now the release button 14 is actuated, i.e., moved to the right in FIG. 20, the shaft 200 will turn clockwise, whereby the connecting rod 198 is pulled down. This movement will first cause the ratchet 194 to turn clockwise (FIG. 19) against the action of the comparatively weak loop spring and thus to be brought into engagement with control teeth 205 provided on the setting ring 186. Thus the rings 190, 186 become coupled to each other, so that the continued downward movement of the connecting rod 198 will cause both rings to turn clockwise. This rotation will continue until a stop 206 provided on the ring 190 comes up against a firmly set film sensitivity setting means 207. As shown in dashed lines, this setting means 207 may be provided with a setting indicator and movable along the film sensitivity scale. It is shown, however, in FIG. 20 that the film sensitivity setting means 207 may also form part of an automatic device, which will be described later on.

As soon as the stop 206 has come up against the film sensitivity setting means 207, the two rings stop, the setting of the ring 186 being henceforth determined by the setting of the film sensitivity setting means 107. Thus when the ring 186 is rotated the size of the diaphragm aperture 182 will deviate more or less from its original value according to the film sensitivity which has been set. Any further downward movement of the shaft 200 and so of the lever 199 and the connecting rod 198 will result only in a deformation of the leaf spring 196.

In order to be able to impart to the diaphragm 182 the sensitivity of some other film whose shutter is released by the release button 15, there is provided, as will be seen from FIG. 19, an identical mirror-image arrangement, the parts having the same function being assigned the same reference symbols, but with a stroke. Since the arrangement is a mirror image, it is not possible for the ratchet 194' to co-operate directly with the diaphragm setting ring 186, because it would then operate in the sense of rotation opposite to the action of the ratchet 194. For this reason the film sensitivity setting ring 186 is equipped with normal teeth 209 meshing with the teeth of an intermediate gear 210. The ratchet 194' co-acts with the teeth of this intermediate gear 210. It is apparent that the intermediate gear 210 serves solely to reverse the sense of rotation. It will be appreciated that it is possible within the scope of the invention to provide other devices for reversing the action of the pawl 194'.

In FIG. 20 it is shown how the film sensitivity setting stop 207 can be made part of an automatic device by means whereof the coding 142 of the cassette 2 can be sensed. For this purpose a step plate 214, loaded by a spring 213, is passed in a way known as such through an opening 211 in a wall 212 of the camera, the step plate 214 is pressed back by the rib of the cassette bordering the recess 142 when the cassette 2 is inserted against the action of the spring 213. The size of the adjusting travel of the step plate 213 depends upon the size of the recess 142. The longer is this recess 142 the more steps of the plate 214 will be able to enter it before the plate 214 is pushed back by the rib of the cassette 2.

The step plate 214 is mounted upon an elbow lever 215, which pivots on a pin 216 fixed to the instrument. The film sensitivity stop 207 is likewise slewable about a pivot 217 fixed to the apparatus, the other end of this lever having a slot 218. A pin 219 upon the elbow lever 215 is passed through this slot 218.

If, therefore, the release button 14 is moved to the right, so that the connecting rod 198 is pulled down, the two rings 186 and 190 become coupled together for joint rotation until the stop 206 on the lever 207 comes to abutment. Although in this way a clockwise torque is transmitted to the bell-crank lever 215, so that this is loaded in the clockwise sense, the step plate 214 bears against the rib on the cassette 2, so that neither lever 207, 215 can rotate, and the lever 207 opposes firm resistance to any further rotation of the two rings 186, 190. It is clear that a similar arrangement can also be provided for the coding of the cassette for the still-picture film. This arrangement can be substantially as described with reference to FIG. 20 so that it is unnecessary to repeat this description.

It wil be seen from the earlier description that the arrangements co-acting with the two rings 190 and 190' constitute in each case an AND gate, for the diaphragm 182 will not be set according to the relevant correct film sensitivity unless the film sensitivity setting means 207 or 207' is correctly set and the associated release means 14 or 15 has been actuated.

Another construction will now be described with reference to FIG. 21, where, apart from the diaphragm, which is not shown, is known as such and may be of any suitable design, a grey filter disc 220 is provided behind the objective 5 soley for taking into account the sensitivity of the film. The operation of this grey filter disc 220 is practically analogous to that described in connection with FIG. 19, so that parts of like function bear like reference symbols. Since the function has already been particularly described in the case of FIG. 19, it need no longer be considered in detail. It will further be seen that the ring 190 has been replaced by a sector 190a. Instead of the motion reversing gear employing an intermediate wheel 210, the arrangement in FIG. 21 is such that the teeth 205 are formed upon a comparatively wide edge 221 surrounding the disc 220. FIG. 22 is a side elevation of FIG. 21, and it will be seen that on both sides of the disc 220 the sectors 190a and 190' are coaxially mounted and so operate in the same sense. The two pawls 194 and 194' are made sufficiently narrow to be able to co-act with the relatively wide teeth 205 without getting into each other's way. It will further be seen from FIG. 22 that the one film sensitivity setting means 207 is formed so short that it can project only into the path of the sector 190, whereas the other film sensitivity setting means 207' is cut somewhat short to leave enough room for the sector 190a.

The carrying of the invention into effect is not restricted to the use of two actuating means 14 and 15 for the release of the two shutters. It is also possible to use a single actuating means, the change from one film sensitivity to another being then effected by means of a pre-setter of the type of the preselector switch 42.

Another construction using electric means is shown in FIG. 23, in which an electric exposure control circuit 222 is provided, as is a general practice in cameras. This control circuit 222 contains in the usual way a photoelectric instrument transformer 223 and in the individual branches of the bridge adjustable resistors 224 and 225 for different exposure factors. In the one bridge diagonal lies a source of current 226, in the other bridge diagonal an electro-motive instrument transformer 227 through which the objective diaphragm is controlled.

In one branch of the bridge is provided a resistor 228 for setting the sensitivity of the motion-picture film, and at least one resistor 229 for setting the sensitivity of the still-picture film. It is advantageous, however, to connect a further resistor 230 to the resistor 229, the resistor 230 serving to indicate the variable shutter timing for still-picture films, whereas the shutter timing of the cinematographic film may stay constant. If, though, the camera is to have a range of several filming speeds, it is of advantage to connect to the resistor 228 as well a shutter-time setting resistor for varying the speed of filming.

It will be seen that the branch of the bridge which contains the resistors 228 to 230 is normally open. A contact lug 231 normally occupies a middle position, as indicated in FIG. 23 by two tension springs. The contact lug 231, however, is acted upon in opposite senses by the release means 14 and 15 when these are actuated, so that when the release means 14 is actuated the lug 231 is moved into a position in which the branch of the bridge is closed over the resistor 228; whereas if the release means 15 is actuated the bridge branch is closed over the resistors 229 and 230. in such a construction, however, it is advantageous if the release means is formed in the known way as a sequence switch, so that the bridge 222 is closed first and only then, say, after overcoming a pressure point, is the corresponding shutter released. This ensures that the diaphragm has sufficient time to swing into its correct position. Obviously, it is possible here too to actuate the release means by a single actuating element, say, by the release button 17, additional connection contacts leading to the bridge 222 being provided which always close the bridge 222 shortly before the shutter is released correctly in the way represented in FIG. 23.

We claim:

1. In a camera
mean for receiving a photographic film ready for exposure;
means for receiving a cinematographic film ready for exposure;
first shutter means actuable to expose said photographic film;
second shutter means actuable to expose said cinematographic film;
drive means to drive at least one of said first and second shutter means, first release means connected to said first shutter means to control the actuation thereof;
second release means connected to said second shutter means to control the actuation thereof;
an optical system defining an optical path;
mirror means movable into and out of said optical path to direct light from said optical system alternately towards said photographic film and said cinematographic film so as to have a still picture position and a movie taking position;
interlocking means connected to said mirror means on the one hand and to at least one of said first and second release means to prevent release of said first release means with said mirror in cinematographic position and vice versa.

2. A camera as claimed in claim 1 further comprising locking means operatively connected with said second shutter means for preventing the actuation of said first shutter means when said second shutter means is actuated.

3. A camera as claimed in claim 1 further comprising intermittent drive means for transporting said cinematographic film in periodically repeating transporting steps; transport preventing means operatively connected with said mirror means, in the still picture position of said mirror means said transport preventing means locking said intermittent drive means.

4. A camera as claimed in claim 3 further comprising reset means for moving said mirror means from said still picture position into said movie taking position, said reset means including reset control means connected to said drive means for actuating said reset means after a single transporting step is prevented.

5. A camera as claimed in claim 1 wherein said drive means are arranged for imparting movement also to said mirror means.

6. A camera as claimed in claim 5 wherein said mirror means are arranged on one surface of one of said first and second shutter means.

7. A camera as claimed in claim 6 wherein said mirror means are arranged on one surface of said second shutter means to direct light towards said photographic film during a first time period defined by the movement velocity of said second shutter means and the magnitude of said mirror surface passing through said optical path.

8. A camera as claimed in claim 7 wherein said first and second shutter means comprise a common shutter vane with said mirror surface and a cut-out portion, with said shutter vane in said optical path said photographic film is exposed, with said cut-out portion in said optical path said cinematographic film is exposed.

9. A camera as claimed in claim 7 wherein said first shutter means comprise a photographic shutter arranged within said optical path between said mirror means and said photographic film, said photographic shutter being actuable by said first release means to expose said photographic film during at least a second time period, the camera further comprising phase adjusting means to adjust said first time period with respect to said second time period.

10. A camera as claimed in claim 8 wherein said first shutter means further include a first auxiliary shutter movable in and out of said light path before said photographic film, and said second shutter means include a second auxiliary shutter movable in and out of said light path before said cinematographic film, the camera further comprises shutter control means controlling the positions of said first and second auxiliary shutters.

11. A camera as claimed in claim 1 wherein said first and second release means include a common actuator movable from an inoperative position into at least a first operative position for actuating at least one of said first and second shutter means, said interlocking means comprising means for moving said mirror means into and out of said optical path and means for connecting and disconnecting at least one of said first and second shutter means with said actuator simultaneously with the movement of said mirror means.

12. In a camera
 means for receiving a photographic film ready for exposure, said photographic film having at least one frame of first dimensions;
 means for receiving a cinematographic film ready for exposure, said cinematographic film having frames of second dimensions; an optical system defining an optical path and projecting an image of an object into an image plane within the camera;
 mirror means movable into and out of said optical path to direct light from said optical system alternately towards said photographic film and said cinematographic film so as to have a still picture position and a movie taking position; at least a part of said optical system being movable between a first position and a second position, in the first position the image of said object is projected to fill a frame of said first dimensions, in the second position the image of said object is projected to fill a frame of said second dimensions;
 operating means for moving the movable part of said optical system into its positions.

13. A camera as claimed in claim 12 wherein said operating means are also connected to said mirror means for controlling the positions thereof.

14. A camera as claimed in claim 12 further comprising first drive means for transporting said photographic film,
 said first drive means having an operative and an inoperative position;
 second drive means for transporting said cinematographic film, said second drive means having also an operative and an inoperative position;
 said operating means being also connected to said first and second drive means for controlling the positions thereof whereby with said first drive means in operating position said second drive means are in inoperative position and vice-versa.

15. A camera as claimed in claim 12 further comprising first shutter means actuable to expose said photographic film; second shutter means actuable to expose said cinematographic film; release means for actuating alternately either one of said first and second shutter means; said operating means also controlling said release means for preventing false actuation of said first and second shutter means.

16. A camera as claimed in claim 15 wherein said release means include a first releaser for actuating said first shutter means and a second releaser for actuating said second shutter means, the camera further comprising locking means for alternately locking one of said first and second releasers to prevent actuation of the related shutter, said locking means being operable by said operating means.

17. In a camera
 means for receiving a photographic film having a first film speed;
 means for receiving a cinematographic film having a second film speed;
 an optical system defining an optical path;
 mirror means to be arranged within said optical path to provide a first optical axis directed towards said photographic film and a second optical axis directed towards said cinematographic film;
 first adjustable diaphragm means arranged on said first optical axis;
 second adjustable diaphragm means arranged on said second optical axis;
 an electromotoric system for adjusting one of said first aNd second diaphragm means directly;
 control means providing output signals to control said electromotoric system;
 first film speed adjusting means for adjusting said first diaphragm means according to said first film speed;
 second film speed adjusting means for adjusting said second diaphragm means according to said second film speed;
 said control means being connected to one of said first and second film speed adjusting means to receive the respective film speed information;
 first differential means having a first and a second input and an output, the first input being connected to said diaphragm means adjusted directly by said electromotoric system, the output being connected to the other one of said first and second diaphragm means to adjust them indirectly via the diaphragm means adjusted directly;
 second differential means having a third and a fourth input and an output, each of said third and fourth inputs being connected with one of said first and second film speed adjusting means, the output of said second differential means being connected with said second input to adjust said diaphragm means adjusted indirectly according to the related film speed.

18. In a camera
 means for receiving a first cartridge containing photographic film, having a first film speed said first cartridge having coding means showing said first film speed;
 means for receiving a second cartridge containing cinematographic film having a second film speed, said second cartridge having coding means showing said second film speed;
 first sensing means for cooperation with the coding means of said first cartridge to read out said first film speed;
 second sensing means for cooperation with the coding means of said second cartridge to read out said second film speed;
 an optical system defining an optical path;
 mirror means to be arranged within said optical path to provide a first optical axis directed towards said photographic film and a second optical axis directed towards said cinematographic film; first adjustable diaphragm means arranged on said first optical axis;

second adjustable diaphragm means arranged on said second optical axis an electromotoric system for adjusting one of said first and second diaphragm means directly;

control means providing output signals to control said electromotoric system, and being connected to one of said first and second sensing means to receive the respective film speed read out;

first differential means having a first and a second input and an output, the first output being connected to said diaphragm means adjusted directly by said electromotoric system, the output being connected to the other one of said first and second diaphragm means to adjust them indirectly via the diaphragm means adjusted directly;

second differential means having a third and a fourth input and an output, each of said third and fourth inputs being connected with one of said first and second sensing means, the output of said second differential means being connected with said second input to adjust said diaphragm means adjusted indirectly according to the related film speed.

19. A camera as claimed in claim 17 further comprising third differential means having a fifth and a sixth input and an output, the output of said second differential means being connected to said second input via said third differential means by being directly connected with said fifth input whereas the output of said third differential means is directly connected with said second input; adjusting means for adjusting said diaphragm means adjusted indirectly according to at least one further exposure factor, said adjusting means being connected with said sixth input.

20. In a camera
means for receiving a photographic film ready for exposure, said photographic film having a first spectral sensitivity;
means for receiving a cinemarographic film ready for exposure, said cinematographic film having a second spectral sensitivity;
first shutter means actuable to expose said photographic film;
second shutter means actuable to expose said cinematographic film;
first release means connected to said first shutter means to control the actuation thereof;
second release means connected to said second shutter means to control the actuation thereof;
an optical system defining an optical path;
mirror means to be arranged within said optical path to provide a first optical axis towards said photographic film and a second optical axis towards said cinematographic film;
at least one conversion filter movable in and out of said optical path to adopt the color temperature of light coming through said optical system onto at least one of said first and second spectral sensitivities operating means for moving said conversion filter in and out of said optical path;
sensing means for sensing the type of light used for exposure, said sensing means controlling said conversion filter via said operating means;
locking means to prevent actuation of at least one of said first and second shutter means and having an operative and an inoperative position, the positions of said locking means being controlled by said sensing means.

21. A camera as claimed in claim 20 wherein at least one of said photographic and said cinematographic films is contained within a cartridge having coding means showing the spectral sensitivity of the film, contained within the cartridge the camera further comprising:
code sensing means for cooperation with said coding means to read out the respective spectral sensitivity;
AND-gate means having a first and a second input and an output, the first input being formed by said operating means, the second input being formed by said code sensing means and the output controlling said locking means.

22. In a camera
means for receiving a photographic film having a first film speed;
means for receiving a cinematographic film having a second film speed;
an optical system defining an optical path and including adjustable diaphragm means;
mirror means to be arranged within said optical path to provide a first optical axis directed towards said photographic film and a second optical axis directed towards said cinematographic film;
first shutter means arranged at least partly on said first optical axis and being actuable to expose said photographic film;
second shutter means arranged at least partly on said second optical axis and being actuable to expose said cinematographic film;
first release means connected to said first shutter means to control position;
the actuation thereof and having an operative and an inoperative second release means connected to said second shutter means to control the actuation thereof and having an operative and an inoperative position;
first film speed adjusting means for adjusting said diaphragm means according to said first film speed;
second film speed adjusting means for adjusting said diaphragm means according to said second film speed;
said first release means and said first film speed adjusting means forming the inputs of first AND-gate means adjusting the diaphragm means according to said first film speed only with said first film speed adjusting means being in a position according to said first film speed and said first release means being in operative position;
said second release means and said second film speed adjusting means forming the inputs of second AND-gate means adjusting the diaphragm means according to said second film speed only with said second film speed adjusting means being in a position according to said second film speed and said second release means being in operative position.

23. A camera as claimed in claim 22 wherein said diaphragm means include an iris diaphragm having a variable diaphragm aperture and first and second control rings, the first control ring being arranged for varying the diaphragm aperture according to the exposure factors being common to both films, the second control ring being arranged for varying the diaphragm aperture under control of said first and second AND-gate means; the camera further comprising:

coupling means for selectively connecting the outputs of said first and second AND-gate means with said second control ring.

24. A camera as claimed in claim 23 wherein said coupling means are controlled by said first and second release means.

25. A camera as claimed in claim 22 further comprising adjusting means to control said diaphragm means according to exposure factors uncommon to both films, at least said first AND-gate being controllable by said adjusting means.

26. In a camera means for receiving a photographic film having a first film speed, means for receiving a cinematographic film having a second film speed; an optical system defining an optical path;

mirror means to be arranged within said optical path to provide a first optical axis directed towards said photographic film and a second optical axis directed towards said cinematographic film;

at least one adjustable diaphragm means within said optical path;

control means for said diaphragm means for the adjustment thereof in accordance with the exposure factors common to both films;

at least one neutral density filter means arranged within said optical path and being adjustable in accordance with the exposure factor uncommon to both films including film speed.

* * * * *